United States Patent [19]

Renaud

[11] Patent Number: 4,529,075
[45] Date of Patent: Jul. 16, 1985

[54] CLUTCH RELEASE BEARING

[75] Inventor: Pierre Renaud, Le Plessis-Trevise, France

[73] Assignee: Valeo, Paris, France

[21] Appl. No.: 388,978

[22] Filed: Jun. 16, 1982

[30] Foreign Application Priority Data

Jun. 18, 1981 [FR] France ............................. 81 12001

[51] Int. Cl.³ ............................................. F16D 23/14
[52] U.S. Cl. .................................. 192/98; 192/70.13; 192/110 B
[58] Field of Search .................... 192/98, 110 B, 70.13

[56] References Cited

U.S. PATENT DOCUMENTS

| 3,921,776 | 11/1975 | Sonnerat | 192/98 |
| 4,029,186 | 6/1977 | Gennes | 192/98 |
| 4,144,957 | 3/1979 | de Gennes | 192/98 |
| 4,186,828 | 2/1980 | Renaud | 192/98 |
| 4,403,685 | 9/1983 | Beccaris | 192/98 |

FOREIGN PATENT DOCUMENTS

| 2639766 | 3/1978 | Fed. Rep. of Germany . | |
| 2304826 | 10/1976 | France . | |
| 1382354 | 1/1975 | United Kingdom . | |
| 2052001 | 1/1981 | United Kingdom | 192/98 |
| 2054084 | 2/1981 | United Kingdom | 192/98 |
| 2058276 | 4/1981 | United Kingdom | 192/98 |

Primary Examiner—Rodney H. Bonck
Attorney, Agent, or Firm—Charles A. Brown; Charles E. Brown

[57] ABSTRACT

A clutch release bearing comprises an actuator member whereby it is adapted to act on a clutch release device of a clutch mechanism and an operating member whereby it is adapted to be acted on by a control member. The actuator member is axially coupled to the operating member by a cover. Snap-action engagement means between the cover and the operating member comprise at least one elastically deformable lug on the operating member and at least one retaining shoulder on the cover adapted to cooperate with the elastically deformable lug on the operating member. The clutch release bearing is suitable for "traction" type applications, in particular in automotive vehicles.

23 Claims, 14 Drawing Figures

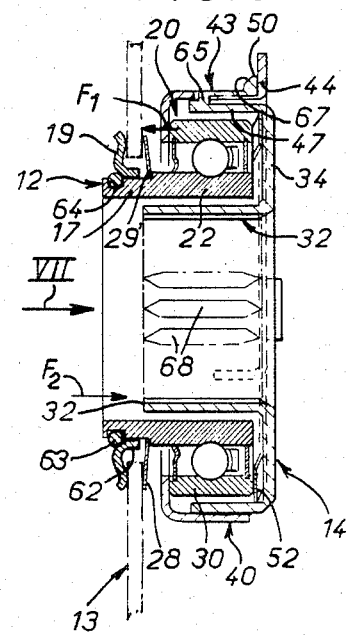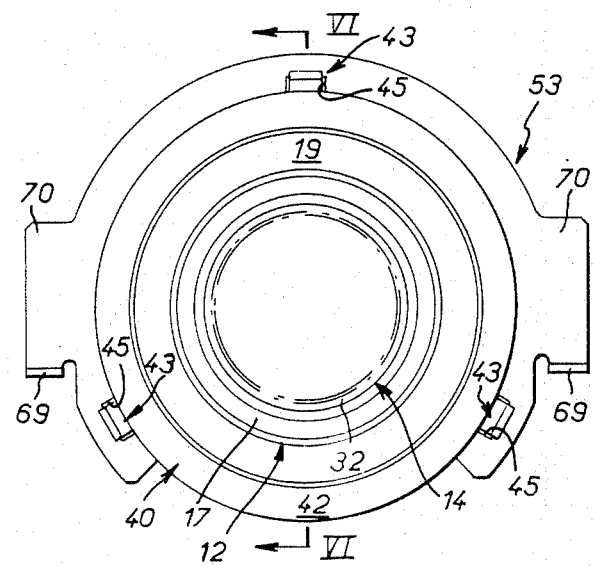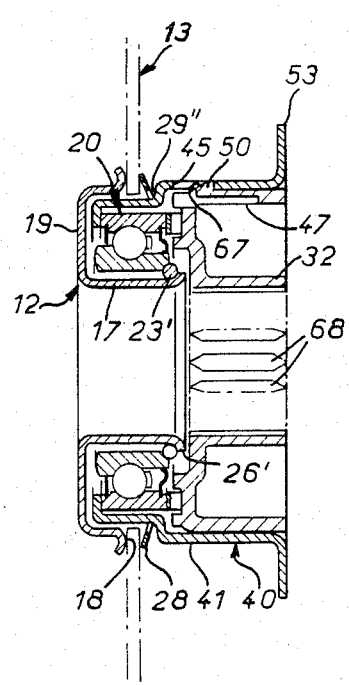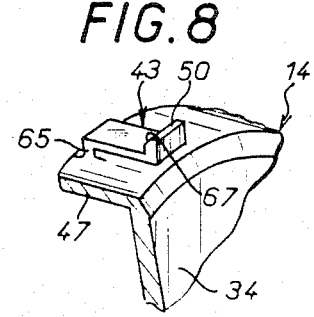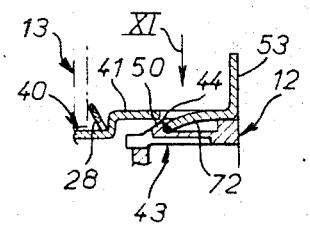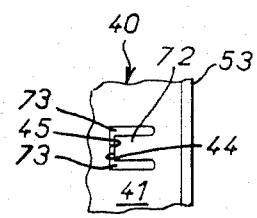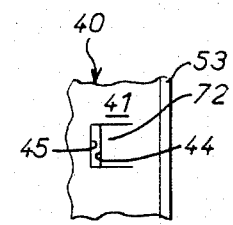

CLUTCH RELEASE BEARING

BACKGROUND OF THE INVENTION

1. Field of the Invention

The present invention is generally concerned with clutch release bearings, and more particularly with clutch release bearings for automotive vehicles.

2. Description of the Prior Art

As is known, a clutch release bearing is designed to act on the clutch release device of a clutch mechanism. It generally comprises an actuator member whereby is is adapted to act on the clutch release device and an operating member whereby it is adapted to be acted on, either directly or indirectly, by a control member, in practice usually referred to as a "yoke", the actuator member being axially coupled to the operating member by a cover.

The present invention is more particularly concerned with clutch release devices which are designed to apply traction to the clutch release device of the clutch mechanism concerned.

A plate, usually referred to as a bearing plate, is then associated with the operating member of the clutch release bearing, to be acted on by the control yoke or clutch release yoke. This plate may be subdivided to form two diametrically opposed arms on which said control yoke may bear in the axial direction, from the side facing the actuator member.

As the cover is usually a metal part while the operating member is usually of a synthetic material, it would be beneficial to have the bearing plate form part of the cover, rather than part of the operating member as is usual, the corresponding part of the operating member, generally a flange, then having to be itself faced with a metal plate forming a bearing plate to minimize the inevitable wear due to the axial force applied by the control yoke when in service.

There then arises the problem of fastening the cover to the operating member so as to axially couple the actuator member to the latter.

This fastening is usually implemented by crimping the axially oriented annular side wall which the cover usually comprises to the perimeter of the transversely disposed flange which the operating member usually comprises.

As a general rule, in the case of a clutch release bearing designed to push on the clutch release device of a clutch mechanism this crimping is relatively easy to implement as it concerns only the clutch release bearing, taken in isolation. This does not apply when, as in this instance, the clutch release bearing is designed to pull on the clutch release device.

In the latter case, the crimping can be effected only when the clutch release bearing is already at least partially coupled to the clutch release device in question, by its actuator member, being therefore somewhat difficult and delicate to carry out under these conditions.

This difficulty is inevitably increased if the associated bearing plate forms part of the cover.

In this case the bearing plate is adjacent that part of the annular side wall of the cover to be crimped, impeding execution of the operations required to effect the crimping.

Furthermore, there are two requirements to be met simultaneously. One concerns the fact that, in order to be able to resist the axial force applied by the control yoke, the metal constituting the bearing plate must be treated so as to improve its resistance to wear, which reduces its ductility. The other is concerned with the fact that, in order to bend readily on crimping, the metal constituting the cover must offer good ductility.

It will be obvious that these two requirements can be reconciled only with difficulty when the bearing plate forms part of the cover, the metal necessarily being the same in both cases and thus not being treatable in its entirety.

A general objective of the present invention is an arrangement enabling these disadvantages to be overcome and conferring other advantages.

SUMMARY OF THE INVENTION

The invention consists in a clutch release bearing suitable for automotive vehicles comprising an actuator member whereby it is adapted to act on a clutch release device of a clutch mechanism, an operating member whereby it is adapted to be acted on directly or indirectly by a control member, in practice a control yoke, a cover whereby said actuator member is axially coupled to said operating member, and snap-action engagement means between said cover and said operating member consisting of at least one elastically deformable lug on said operating member and at least one retaining shoulder on said cover adapted to cooperate therewith.

By virtue of this arrangement no crimping is required to fasten the operating member to the cover.

As a result, the bearing plate usually associated with the operating member may if required form an integral part of the cover. Thus the corresponding metal may easily be appropriately treated in its entirety so as to offer the required resistance to the axial force to which the bearing plate is subjected in service by the control member.

In the case where the bearing plate is integral with the cover, this arrangement also results in an advantageous dissociation between the part which, in service, is subjected to the axial force applied by the control member, in this instance the cover, and the part which, in service, guides the assembly by sliding on a support member, in this instance the operating member. The operating member, which is usually of a synthetic material, is thus relieved of any substantial axial load.

This arrangement further results in a high degree of flexibility with regard to the execution of the operations to be carried out to mount the clutch release bearing on the clutch release device of a clutch mechanism. For at least some embodiments, assembly may terminate, if required, with the snap-action engagement of the operating member with the cover, with the clutch release bearing already mounted in its entirety on the clutch release device.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 6 is a view analogous to that of FIG. 1 and concerns another embodiment of the clutch release bearing in accordance with the invention, seen in axial cross-section on the line VI—VI in FIG. 7.

FIG. 7 is a view in elevation of this embodiment as seen along the arrow VII in FIG. 6.

FIG. 8 is a partial view in perspective of the operating member which the clutch release bearing in accordance with the invention comprises in this embodiment.

FIG. 9 is a view analogous to that of FIG. 6 and concerns a further embodiment.

FIG. 10 corresponds to part of FIG. 9 and concerns a still further embodiment.

FIG. 11 is a partial view in plan of this embodiment, as seen along the arrow XI in FIG. 10.

FIG. 12 is a view analogous to that of FIG. 11 and concerns a yet further embodiment.

DESCRIPTION OF THE PREFERRED EMBODIMENTS

Figure 1:
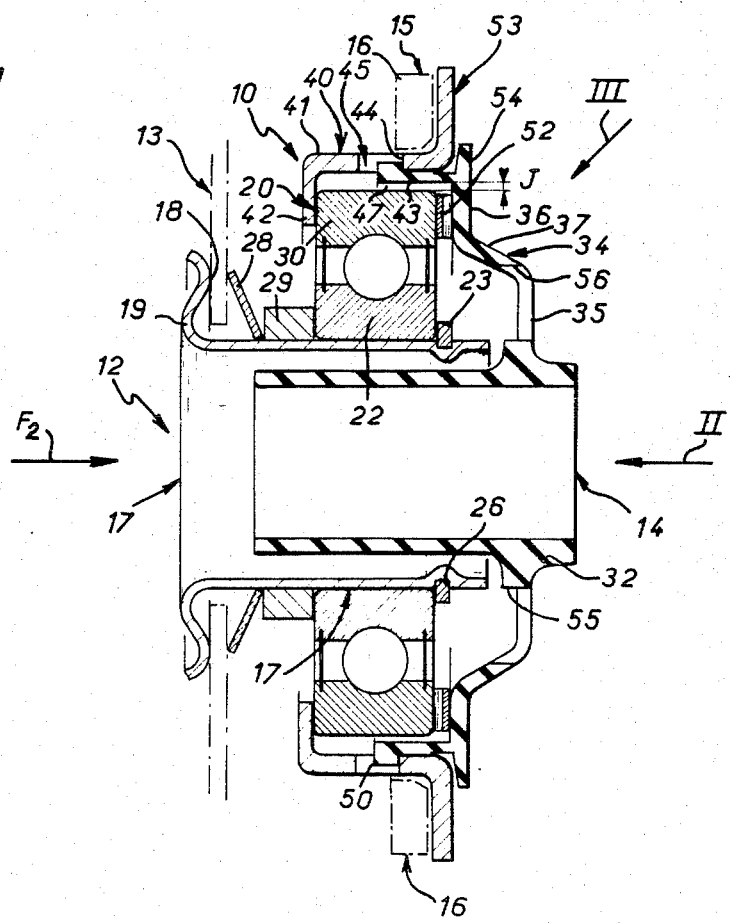
FIG. 1 is an axial cross-section through a clutch release bearing in accordance with the invention, shown mounted on the clutch release device of a clutch mechanism.
Figure 2:
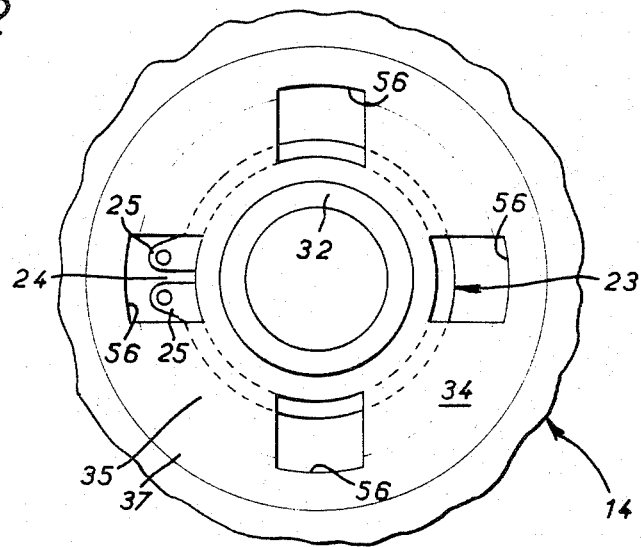
FIG. 2 is a partial view in elevation from the rear, as seen along arrow II in FIG. 1.

As shown in the drawings, the clutch release bearing 10 in accordance with the invention generally comprises an actuator member 12 whereby it is adapted to act on a clutch release device 13 of a clutch mechanism and an operating member 14 whereby it is adapted to be acted on by a control member 15.

Clutch release device 13 is shown in part only and in chain-dotted line, in FIGS. 1, 6 and 9.

It may consist, for example, of the ends of radial fingers of a diaphragm spring.

Likewise, control member 15 is shown in part only and in chain-dotted line, in FIG. 1.

In practice, it consists in a control yoke, fingers 16 of which are engaged transversely on clutch release bearing 10, at two points thereon which are diametrically opposed.

Consisting in practice of a clutch release bearing designed to apply traction to clutch release device 13, actuator member 12 of clutch release bearing 10 in accordance with the invention comprises a bush 17 with at one end a transverse shoulder 18 whereby it is adapted to bear on the surface of clutch release device 13 opposite that facing associated control member 15, so as to act on clutch release device 13.

In practice, in the embodiment shown in FIGS. 1 to 4, with a view to providing shoulder 18 the end of bush 17 concerned is formed with an integral and radial flange 19. In this embodiment, radial flange 19 has a corrugated transverse cross-section, shoulder 18 forming the circumferentially continuous crest of one corrugation.

As will be seen, since bush 17 is integral with radial flange 19 and transverse shoulder 18 formed thereby, the combination offers the advantages of reduced axial length of the resulting component over that of such a component where the shoulder and bush are separate parts secured together as seen in the corresponding part of FIG. 6.

Radial flange 19 of bush 17 is disposed beyond clutch release device 13 relative to control member 15.

In other words, relative to control member 15 it is engaged "behind" clutch release device 13.

As will be readily understood, this involves relative axial engagement of bush 17 and clutch release device 13 in a direction from clutch release device 13 towards control member 15, as indicated by the arrow F2 in FIG. 1.

Actuator member 12 of clutch release bearing 10 in accordance with the invention further comprises a ball bearing 20 one ring of which is secured to bush 17.

In practice, in the embodiment shown in FIGS. 1 to 4, ball bearing 20 is secured to bush 17 by means of its inner ring 22.

To secure it on bush 17 it is associated with a split ring or "circlip" 23 on that side of its inner ring 22 opposite transverse shoulder 18 of bush 17.

Split ring 23 is a simple ring elastically deformable in the circumferential direction, being split by a radial slot 24 (FIG. 2) with the lips delimiting the radial slot forming lugs 25 facilitating handling and opening thereof. In practice, it is engaged radially in an annular groove 26 formed for this purpose in the outside surface of bush 17, adjacent the relevant end thereof.

Groove 26 is machined in line with a locally stamped upstand on bush 17.

In practice, in the embodiments shown, axially acting elastic means in the form of a simple Belleville washer 28 are operative between clutch release device 13 and inner rign 22 of ball bearing 20, through the intermediary of a spacer ring 29.

Clutch release bearing 10 is therefore maintained on clutch release device 13 by virtue of its being gripped between transverse flange 18 of bush 17 of actuator member 12 of clutch release bearing 10 and Belleville washer 28, which bears on split ring 23 via spacer ring 29 and inner ring 22 of ball bearing 20.

Furthermore, by virtue of the presence of spacer ring 29, ball bearing 20 may with advantage, in the embodiment shown in FIGS. 1 to 4, be a standard type ball bearing, that is to say a ball bearing in which outer ring 30 and inner ring 22 have the same dimension in the axial direction.

In the embodiment shown in FIGS. 1 to 4, operating member 14 comprises an axial guide sleeve 32 whereby clutch release bearing 10 is adapted for sliding engagement on a support member such as the "trumpet" usually surrounding the input shaft of an associated gearbox.

For angular indexing of clutch release bearing 10 in accordance with the invention on its support member (not shown in the drawings), the internal surface of sleeve 32 may, in this embodiment, be axially splined, said support member being itself axially splined complementarily.

To provide axial support for outer ring 30 of ball bearing 20 of actuator member 12, operating member 14 of clutch release bearing 10 in accordance with the invention comprises a transverse flange 34 solid with sleeve 32.

In practice, sleeve 32 and flange 34 are integral with one another, being formed simultaneously by molding any suitable synthetic material, for example.

In practice, since ball bearing 20 of actuator member 12 is, in the embodiment shown, a standard ball bearing, as previously mentioned, flange 34 of operating member 14 has two transverse areas, namely an area 35 whereby it is connected to sleeve 32 and an area 36 providing axial support to outer ring 30 of ball bearing 20, said areas 35 and 36 being offset relative to one another in the axial direction and linked together by means of an oblique area 37.

The assembly is held together by means of a cover 40 whereby actuator member 13 is axially coupled to operating member 14.

Cover 40, which is in practice of metal, has an annular side wall 41 extending axially and a rim 42 extending radially inwards to provide axial retaining means for ball bearing 20. Outer ring 30 of ball bearing 20 bears on this radial rim 42.

In accordance with the invention, between cover and operating member 14 are disposed snap-action engagement means comprising at least one elastically deformable lug 43 provided for this purpose on operating member 14 and at least one retaining shoulder 44 provided for this purpose on cover 40 to cooperate with the or a respective elastically deformable lug 43 on operating member 14.

Figure 3:
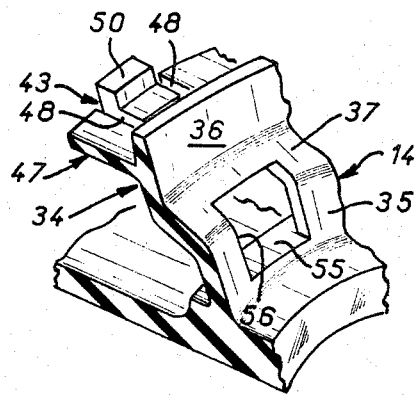
FIG. 3 is a partial view in elevation from the rear, as seen along arrow III in FIG. 2.

In practice, in the embodiment shown in FIGS. 1 to 4, four elastically deformable lugs 44 are equi-angularly distributed and extend axially, projecting from flange 34 of operating member 14. They locally interrupt an annular side wall 47, which may be subdivided circumferentially, projecting axially from flange 34 in order to center cover 40. Elastically deformable lugs 43 are separated from this ring 47 by slots 48 (FIG. 3).

Thus elastically deformable lugs 43 extend generally within the thickness of annular side wall 47 of operating member 14 by virtue of openings, in this instance notches, therein.

Moreover, each elastically deformable lug 43 has a bead 50 projecting radially outwards to cooperate with the corresponding retaining shoulder 44 on cover 40.

In the embodiment shown in FIGS. 1 to 4, retaining shoulders 44 on cover 40 and cooperating with elastically deformable lugs 43 of operating member 14 are formed by the edges of openings 45 provided for this purpose in annular side wall 41, the number thereof being equal to the number of elastically deformable lugs 43.

For preference, and as shown, bead 50 of elastically deformable lugs 43 is circumferentially complementary with opening 45, so as to key cover 40 against rotation on operating member 14.

This is not necessarily the case in the axial direction, however.

On the contrary, and as shown, there is preferably axial play between bead 50 of an elastically deformable lug 43 and the corresponding opening 45 in cover 40.

As this is a self-centering clutch release bearing, actuator member 12 is able to move in any direction relative to operating member 14, within the limits of a predetermined annular clearance J provided for this purpose between ball bearing 20 of actuator member 12 and ring 47 of operating member 14.

Since the clutch release bearing is also of the continous self-centering type, outer ring 30 of ball bearing 20 of actuator member 12 does not bear directly on flange 34 of operating member 14 in the embodiment shown. Instead it acts through axially acting elastic means.

In these embodiments, this consists in practice of a corrugated washer 52 of the type available commercially under the Trade Name "ONDUFLEX".

It will be understood that as an alternative outer ring 30 of ball bearing 29 could bear directly on flange 34 of operating member 14, elastic washer 52 then being placed between axial rim 42 of cover 40 and outer ring 30.

Likewise, in the embodiments shown, as operating member 14 is in practice of a synthetic material, control member 15 does not act directly on operating member 14. Instead it acts through the intermediary of a bearing plate 53 extending in a generally transverse direction and associated to this end with operating member 14. In practice this plate is of metal.

In accordance with the invention, bearing plate 53 (which may be reduced to two radial arms directed in substantially diametrically opposed directions) is connected to cover 40, being integral therewith.

In the embodiment shown in FIGS. 1 to 4, bearing plate 53 forms at the end of annular side wall 41 of cover 40 opposite radial rim 42 a lip which is directed radially outwards, being united to side wall 41 through a portion with a large radius of curvature.

Because of this curvature, the operative surface of bead 50 of elastically deformable lug 43 does not need to be chamfered to facilitate engagement of lugs 43 in side wall 41 of cover 40.

As will be seen, flange 34 of the operating member is extended in the radial direction by a rim 54 beyond elastically deformable lugs 43 and, more specifically, beyond annular side wall 47 which the latter interrupts locally. In practice, and as shown, slight assembly clearance is left between rim 54 and bearing plate 53.

In accordance with the invention, operating member 14 in the embodiment shown in FIGS. 1 to 4 comprises a bearing surface 55 which temporarily accommodates split ring 23.

In practice, bearing surface 55 is disposed on that side of flange 34 of operating member 14 which is towards bush 17 of actuator member 12 and has a diameter which is substantially equal to that of the outside surface of said bush.

Furthermore, flange 34 of operating member 14 has at least one opening 56 providing access to the outside of bearing surface 55.

In practice, a number of openings 56 are provided, equi-angularly distributed and four in number in the embodiment shown.

Furthermore, one edge of each of openings 56 is level with bearing surface 55 with which it is associated, which is disposed in the immediate vicinity of flange 34.

Figure 4A:
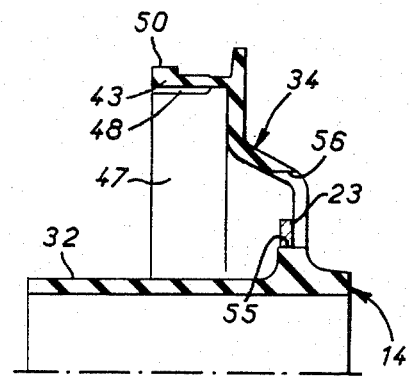
FIGS. 4A, 4B, 4C are axial cross-sections showing successive phases in the assembly of the clutch release bearing in accordance with the invention and its mounting on the associated clutch release device.

On beginning assembly of clutch release bearing 10 thus constituted in accordnce with the invention, split ring 23 is temporarily positioned on bearing surface 55 (FIG. 4A).

At this time split ring 23 is in a pre-stressed configuration on bearing surface 55, with its diameter exceeding its diameter in the unstressed configuration.

Figure 4B:
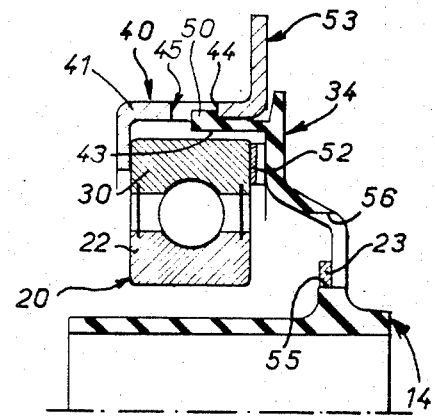

Cover 40 is then assembled to operating member 14, with ball bearing 20 and spring washer 52 between them (FIG. 4B).

To achieve this, it is only necessary to engage elastically deformable lugs 43 of operating member 14 in annular wall 41 of cover 40, elastically deformable lugs 43 being temporarily and elastically deformed inwardly until, when bead 50 reaches the corresponding opening 45 in annular wall 41, they resume their initial configuration, whereby bead 50 engages in opening 45, in which it is urged by spring washer 52 into contact with the edge of the opening constituting the associated retaining shoulder 44.

Thus in accordance with the invention there is a simple snap-action engagement of operating member 14 on cover 40.

Figure 4C:
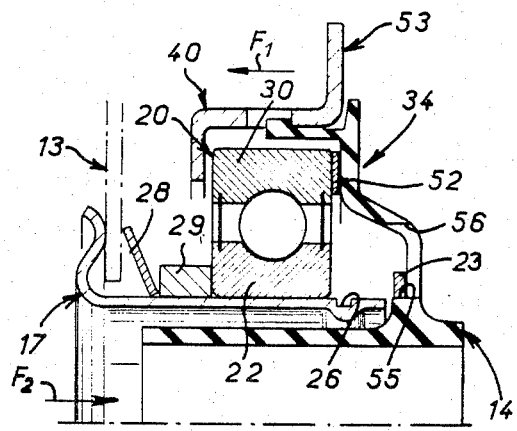

This is followed by relative axial engagement in a first direction shown by the arrow F1 in FIG. 4C of the sub-assembly thus constituted and bush 17, following relative axial engagement in the opposite direction as shown by the arrow F2 in FIG. 4C of the latter with clutch release device 13 of the clutch mechanism concerned, and the insertion of Belleville washer 28 and spacer ring 29.

It is then merely necessary to manipulate the outside of split ring 23, through openings 56 provided for this purpose in flange 34 of operating member 14, so that it moves off bearing surface 55 of operating member 14 to engage bush 17, clicking into groove 26 provided for this purpose on its outside surface.

In practice, this is achieved by simply pushing on split ring 23, the number and distribution of openings 56 through which this action is exerted being such as to prevent split ring 23 skewing during this movement.

To facilitate the movement of split ring 23 off bearing surface 55 on operating member 14 of bush 17, axial force is exerted on operating member 14 and/or on bearing plate 53, as shown by the arrow F1 in FIG. 4C, while applying force in the opposite direction to bush 17, as shown by the arrow F2 in FIG. 4C, the result of which is that bush 17 moves towards bearing surface 55, concomitantly compressing spring washer 52 in the axial direction, as shown in FIG. 4C.

Alternatively, with the spring washer disposed between cover 40 and ball bearing 20 as mentioned above, it is Belleville washer 28 which is compressed.

Whichever is the case, slight assembly clearance is initially provided between split ring 23 and ball bearing 20, as shown in FIG. 4C. To provide this assembly clearance, ball bearing 20 is at a small distance from groove 26 in which split ring 23 must locate.

This assembly clearance is intended to facilitate the positioning of split ring 23 and is automatically eliminated in service on the first clutch release operation, as shown in FIG. 1.

It will be realized that it has been assumed that, prior to the action on split ring 23, bush 17 is centered on operating member 14, in spite of the capacity for movement relative thereto in all directions, so that at all points on its perimeter its external surface is aligned with bearing surface 55 of operating member 14.

MODIFICATIONS

Figure 5:
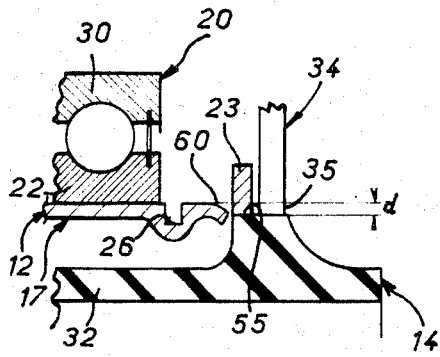
FIG. 5 corresponds to part of FIG. 4C and relates to the alternative embodiment.

In an alternative embodiment shown in FIG. 5, bush 17 has at its free end adjacent bearing surface 55 of operating member 14 a generally frusto-conical inwardly tapering section 60. The difference d between the diameter of the main part of the outside surface of bush 17, which is substantially equal to that of bearing surface 55, and the diameter of the free end of bush 17 is at least equal to the maximum annular clearance governing radial movement of actuator member 12 relative to operating member 14.

This ensures that, even in the event of total decentralization of actuator member 12 relative to operating member 14, the free end of bush 17 is at all points radially inside bearing surface 55, which facilitates the movement of split ring 23 from bearing surface 55 onto bush 17.

In the embodiment shown in FIGS. 6 to 8, bush 17 is formed by an axial extension of inner ring 22 of ball bearing 20.

The radial flange associated with bush 17 and which bears via shoulder 18 on the clutch release device of the clutch mechanism concerned then constitutes a part separate from bush 17, engaged axially on it by means of an axial rim 62.

Behind radial flange 19 is an elastic retaining ring 63, which may consist of an elastic ring split radially, for example, engaged for this purpose in a groove 64 in bush 17.

On the other side of clutch release device 13 Belleville washer 28 bears on a tranverse shoulder 29' of bush 17.

As previously, since the clutch release bearing is again of the continously self-centering type, an annular clearance is left for ball bearing 20 between sleeve 32 and annular side wall 47 of operating member 14 and corrugated spring washer 52 is inserted axially between outer ring 30 of ball bearing 20 and flange 34 of operating member 14.

As previously, in accordance with the invention there are provided between operating member 14 and cover 40 snap-action engagement means in the form of elastically deformable lugs 43 on operating member 14 and retaining shoulders 44 on cover 40.

In the embodiment shown in FIGS. 6 to 8, however, there are three elastically deformable lugs 43, equiangularly spaced, and the same number of retaining shoulders 44.

Furthermore, in this embodiment elastically deformable lugs 43, which extend axially as in the previous embodiments, extend from a root or foot portion 65 of annular side wall 47 of operating member 14, thereby extending parallel thereto outside the volume it delimits.

In practice, in the embodiment shown the root or foot portion 65 of each of elastically deformable lugs 43 is disposed in the vicinity of the end of annular side wall 47 of operating member 14 farthest from flange 34 thereof, so that elastically deformable lugs 43 extend towards said flange and thus away from clutch release device 13 of the clutch mechanism concerned. Thus it is via the edge of their ends that they cooperate with retaining shoulders 44 provided for this purpose on cover 40.

For preference, and as shown, the ends of elastically deformable lugs 43 designed to cooperate via their edges with retaining shoulders 44 of cover 40 are thickened by means of a bead 50, as previously.

In the embodiment shown, bead 50 has a chamfer 67 on the side opposite said edge.

In the embodiment shown, the main part of elastically deformable lugs 43 is thinner than annular side wall 47 of operating member 14, being sufficiently thick, however, to confer adequate resistance to buckling on elastically deformable lugs 43.

In this embodiment, root or foot portion 65 of elastically deformable lugs 43 is thicker than the main part thereof, this thickness being comparable with that of annular side wall 47 of operating member 14, for example.

Elastically deformable lugs 43 formed in this way offer the advantage of good flexibility, favoring the temporary deformation required to fit operating member 14 with cover 40 by means of a snap-action engagement. Also, the molding of operating member 14 is a simple matter, as elastically deformable lugs 43 may be removed from the mold in the axial direction.

In the embodiment shown in FIGS. 6 to 8, annular side wall 47 of operating member 14 is circumferentially continuous, so that it is continuous in line with elastically deformable lugs 43. If required, however, it may be subdivided circumferentially and/or formed with openings in line with elastically deformable lugs 43.

In the embodiment shown, in order to cooperate with the support member on which it is slideably engaged, sleeve 32 of operating member 14 has ribs 68 which project radially inwards, in a manner known per se. These are axially aligned and their ends are chamfered.

As previously, bearing plate 53 is integral with cover 40, extending over only part of the perimeter thereof, however. It forms two radial arms 70 diametrically opposed to one another and on which the associated control member acts.

In practice, for angular indexing of the clutch release bearing on its support member, each of radial arms 70 of bearing plate 53 has a turned-back section 69 in the embodiment shown, to cooperate with the fingers of the associated control yoke.

As previously, annular side wall 41 of cover 40 comprises openings 45 corresponding to elastically deformable lugs 43 of operating member 14. These extend axially to and partially into bearing plate 53, however.

As a result, retaining shoulders 44 on cover 40 which cooperate with elastically deformable lugs 43 of operating member 14 are formed directly by bearing plate 53 itself.

As previously, bead 50 on elastically deformable lugs 43 is circumferentially complementary to openings 45 in cover 40. The same applies to the root or foot portions 65 of elastically deformable lugs 43 so that these root or foot portions 65 are at least partially involved in blocking rotation of cover 40 on operating member 14.

This blocking of rotational movement could be provided by these root or foot portions 65 of elastically deformable lugs 43 alone, if they were sufficiently long in the radial direction for elastically deformable lugs 43 and thus their beads 50 to escape from the associated openings 45.

To assemble the clutch release bearing thus constituted, the first step is to fit onto the clutch release device 13 concerned, in the direction shown by the arrow F1 in FIG. 6, Belleville washer 28, cover 40 and ball bearing 20 and to fit radial flange 19 and elastic ring 63 in the opposite direction, as shown by the arrow F2 in FIG. 6.

Assembly is then completed by snapping operating member 14 onto cover 40, inserting corrugated washer 52.

During the snap-action engagement of operating member 14 on cover 40, elastically deformable lugs 43 of operating member 14 are deformed temporarily and elastically, as previously, until released from bearing plate 53, this being facilitated by chamfer 67.

Thus it will be seen that during such assembly the root or foot portions 65 of elastically deformable lugs 43, generally level with annular side wall 41 of cover 40, offer the advantage of protecting elastically deformable lugs 43.

In the embodiment shown in FIG. 9, bush 17 is independent of ball bearing 20, as is the case in the embodiment shown in FIGS. 1 to 4. Also, and again as in that embodiment, radial flange 19 associated with it is in fact integral with it.

In this embodiment, however, ball bearing 20 and cover 40 must be radially engaged in the central opening of clutch release device 13 of the clutch mechanism concerned. Radial flange 19 partially surrounds ball bearing 20 and cover 40 so that its transverse shoulder 18 can bear on clutch release device 13, on the opposite side of which Belleville washer 28 bears on a transverse shoulder 29″ provided for this purpose on cover 40, more specifically on annular side wall 41 thereof.

To retain elastic ring 23′ constituting a backing member for ball bearing 20, bush 17 has at the axial end concerned a rim 26′ directed radially outwards.

As previously, since the clutch release bearing is again of the continuous self-centering type, annular clearance is left for ball bearing 20 between bush 17 and annular side wall 41 of cover 40. Corrugated washer 52 is inserted between outer ring 30 of ball bearing 20 and flange 34 of operating member 14.

In the embodiment shown, sleeve 32 and annular side wall 47 of operating member 14 extend axially in the opposite direction to clutch release device 13, and thus in the direction opposite to actuator member 12.

As previously, bearing plate 53 is integral with cover 40 and extends continuously and circumferentially around the perimeter of the latter, for example, as shown in the drawings.

Finally, and again as previously, in accordance with the invention there are provided between operating member 14 and cover 40 snap-action engagement means in the form of elastically deformable lugs 43 on operating member 14 and retaining shoulders 44 on cover 40.

In the embodiment shown, elastically deformable lugs 43 of operating member 14 extend generally within the thickness of annular side wall 47 thereof, by virtue of openings provided for this purpose in annular side wall 47. Their roots are disposed at the end of annular side wall 47 farthest from clutch release device 13, and they extend axially towards the latter.

As previously, their main part is thinner than annular side wall 47, so that they have good flexibility.

Also, in order to cooperate with retaining shoulder 44 associated with cover 40, they have a bead 50 which is preferably (and as shown) formed with a chamfer 67.

In the embodiment shown in FIG. 9, retaining shoulders 44 on cover 40 which cooperate with elastically deformable lugs 43 on operating member 14 are formed by the edges of openings 45 provided for this purpose in annular wall 41, in line with elastically deformable lugs 43.

As an alternative, and as shown in FIGS. 10 to 12, each retaining shoulder 44 is formed by the edge of a tongue 72 integral with and stamped out from annular side wall 41 of cover 40, lying in an opening 45 therein.

Tongue 72 may be separated by slots 73 from the corresponding edges of opening 45 in which it is formed (FIG. 11), or simply made by cutting annular side wall of cover 40 (FIG. 12).

Be this as it may, mounting of the corresponding clutch release bearing on clutch release device 13 is effected by axial engagement in a first direction of bush 17 and in the opposite direction of Belleville washer 28, cover 40 and ball bearing 20, elastic ring 23 being positioned on bush 17. As previously, assembly terminates with the snap-action engagement of operating member 14 on cover 40, following insertion of corrugated washer 52.

It will be understood that the present invention is not limited to the embodiments described and shown, and that it covers all variants of implementation, specifically with regard to the conditions under which the actuator member is axially coupled to the operating member and the conditions under which the control member may act on the operating member.

Similarly, the bearing member associated with the operating member and permitting same to be acted on by the control member is not necessarily a bearing plate separate from said operating member and fast with the cover coupling the latter to the actuator member, being axially coupled to the operating member by this cover. It could equally well consist, for example, in a radial extension of the operating member flange or of a bearing plate in back-to-back relationship therewith, or even of a second flange fast with the operating member sleeve in the axial direction and extending parallel to the first flange and at some distance therefrom.

In all cases, and as will have been appreciated, it is possible to detach the clutch release bearing from the associated clutch release mechanism if required.

All that is required, in the embodiments shown in FIGS. 1 to 5, is to manipulate the split ring through the openings provided in accordance with the invention in the flange of the operating member, or to manipulate the elastically deformable lugs of the operating member in the other embodiments shown.

It is claimed:

1. A clutch release bearing for an automotive clutch, said clutch release bearing comprising an acutator member adapted to coact with a clutch release device of the clutch, an operating member adapted to be displaced by a control member for controlling the operating of the release bearing, a cover for axially coupling said actuator member to said operating member, a bearing plate in one-piece construction with said cover for engagement with the control member, and snap-action engagement means for attaching said cover and said operating member together comprising at least one elastically deformable lug on said operating member and at least one retaining shoulder on said cover for engagement with said lug.

2. A clutch release bearing according to claim 1, wherein said elastically deformable lug on said operating member extends in an axial direction.

3. A clutch release bearing according to claim 2, wherein said operating member incorporates a transverse flange and said elastically deformable lug thereon projects axially from said flange.

4. A clutch release bearing according to claim 3, wherein said transverse flange on said operating member extends radially beyond said elastically deformable lug thereon into axial alignment with said bearing plate.

5. A clutch release bearing according to claim 4, wherein said elastically deformable lug of said operating member includes a bead cooperable with said retaining shoulder of said cover.

6. A clutch release bearing according to claim 4, wherein a free end of said elastically deformable lug of said operating member cooperates with said retaining shoulder.

7. A clutch release bearing according to claim 2, wherein said cover includes an annular side wall which extends in an axial direction and wherein said retaining shoulder is formed by an edge of an opening provided in said annular side wall.

8. A clutch release bearing according to claim 7, wherein a bead is formed on said elastically deformable lug of said operating member circumferentially complementary to the opening in the side wall of said cover.

9. A clutch release bearing according to claim 2, wherein said cover includes an annular side wall which extends in an axial direction and wherein said retaining shoulder comprises an edge of a tongue integral with said annular side wall and lying in an opening therein.

10. A clutch release bearing according to claim 1, comprising a plurality of elastically deformable lugs and an equal number of corresponding shoulders.

11. A clutch release bearing for an automotive clutch, said clutch release bearing comprising an actuator member, said actuator member comprising a bush having a transverse flange at one end for cooperation with the clutch release device, an operating member adapted to be operatively controlled by a control member, a cover axially coupling said actuator member to said operating member, an antifriction bearing operatively interposed between said operating member and said actuator member, one of the races of said antifriction bearing being in engagement with said bush, a split ring for axially retaining said antifriction bearing on the side of said one race axially remote from said transverse flange, said operating member having a transverse flange for providing axial support for the other race of said antifriction bearing, said operating member having axially between its transverse flange and said actuator member a bearing surface for temporarily accommodating said split ring, said operating member transverse flange having at least one opening therein for providing access to said bearing surface from the side of said operating member transverse flange axially remote from said bearing surface.

12. A clutch release bearing according to claim 11, wherein one edge of said opening is level with said bearing surface.

13. A clutch release bearing according to claim 12, wherein said flange of said operating member comprises a plurality of openings distributed circumferentially.

14. A clutch release bearing according to claim 11, wherein said bearing surface of said operating member is of substantially the same diameter as the external surface of said bush of said actuator member.

15. A clutch release bearing according to claim 11, being a clutch release bearing of the self-centering type, wherein said actuator member is able to move relative to said operating member in all radial directions, within the limits of a predetermined annular clearance, said bush of said actuator member having a generally frustoconical inwardly tapering section at a free end remote from said transverse flange, on the same side as said split ring.

16. A clutch release bearing according to claim 15, wherein the difference between the diameter of a main part of the external surface of said bush of said actuator member and the diameter of the free end of said bush is at least equal to the maximum annular clearance governing radial movement of said actuator member.

17. A clutch release bearing according to claim 11, snap-action engagement means operatively disposed between said cover and said operating member comprising at least one axially extending elastically deformable lug on said operating member and at least one retaining shoulder on said cover.

18. A clutch release bearing for an automotive clutch, said clutch release bearing comprising an actuator member adapted to coact with a clutch release device, an operating member, having an axially extending circumferentially dividable, annular side wall adapted to be operatively controlled by a control member, a cover axially coupling said actuator member to said operating member, snap-action engagement means operatively disposed between said cover and said operating member comprising at least one axially extending elastically deformable lug attached to said annular side wall, said elastically deformable lug extending generally parallel to said side wall of said operating member and disposed outside the volume delimited by said side wall and at least one retaining shoulder on said cover for engagement with said lug.

19. A clutch release bearing according to claim 1, wherein a generally transversely disposed bearing plate associated with said operating member and acted on by said control member is connected to said cover.

20. A clutch release bearing according to claim 19, wherein said bearing plate is integral with said cover.

21. A clutch release bearing for an automotive clutch, said clutch release bearing comprising an actuator member adapted to coact with a clutch release device, an operating member, having an axially extending annular side wall, adapted to be operatively controlled by a control member, a cover axially coupling said actuator member to said operating member, snap-action engagement means operatively disposed between said cover and said operating member comprising at least one axially extending elastically deformable lug on said operating member, said elastically deformable lug being disposed in an opening in said side wall of said operating member and lying generally within the thickness of said side wall, and at least one retaining shoulder on said cover for engagement with said lug.

22. A clutch release bearing for an automotive clutch, said clutch release bearing comprising an actuator member adapted to coact with a clutch release device, an operating member, having an axially extending annular side wall, adapted to be operatively controlled by a control member, a cover axially coupling said actuator member to said operating member, said cover comprising an axially extending annular side wall and a transverse bearing plate, snap-action engagement means operatively disposed between said cover and said operating member comprising at least one axially extending elastically deformable lug on said operating member cooperable with at least one retaining shoulder on said cover, said retaining shoulder being defined by a portion of said bearing plate, an opening being formed in said side wall of said cover in alignment with and extending to said portion of said bearing plate.

23. A pull type clutch release bearing for an automotive clutch, comprising an operating member of synthetic material comprising a sleeve for sliding movement on a fixed guide and a transverse flange extending radially outwardly from said sleeve, an actuator member adapted to be coupled to a clutch release device, an antifriction bearing operatively interposed between said operating member and said actuator member, one race of said antifriction bearing fitted in said actuator member, the other race of said antifriction bearing axially interposed between said transverse flange of said operating member and a metal cover, said cover comprising a transverse portion for effectively bearing axially against said other race of said antifriction bearing, a side wall surrounding said other race and a bearing plate adapted to cooperate with a control member for controlling the operation of said release bearing, said operating member having an annular portion extending from said transverse flange and coaxial with said sleeve, and detent means being provided on said annular portion for engagement with a retaining shoulder on said side wall of said cover.

* * * * *